US006426922B1

United States Patent
Machida et al.

(10) Patent No.: US 6,426,922 B1
(45) Date of Patent: Jul. 30, 2002

(54) INFORMATION REPRODUCING SYSTEM INCLUDING A MASTER AND A SLAVE SYSTEM

(75) Inventors: Moriyasu Machida; Yukimasa Suzuki; Nobuyoshi Koike; Takakazu Sugiyama; Kimio Matsusaka, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/364,040

(22) Filed: Jul. 30, 1999

(30) Foreign Application Priority Data

Jul. 31, 1998 (JP) ............................................. 10-217984

(51) Int. Cl.[7] ............................. H04B 1/20; G11B 17/22
(52) U.S. Cl. ....................... 369/2; 369/30.06; 360/98.04
(58) Field of Search .......................... 369/2, 4, 30, 34, 369/36, 33, 77.02, 271, 30.06, 30.07, 30.08, 30.09, 30.04, 30.2; 395/309, 306; 360/98.01, 98.04, 98.05, 98.06

(56) References Cited

U.S. PATENT DOCUMENTS 5,615,345 A  * 3/1997 Wanger ...................... 710/129
5,726,956 A  * 3/1998 Kanno ......................... 369/30
5,999,497 A  * 12/1999 Ochiai et al. .................. 369/2

* cited by examiner

Primary Examiner—Ali Neyzari
(74) Attorney, Agent, or Firm—Arent Fox Kintner Plotkin & Kahn, PLLC

(57) ABSTRACT

Two reproducing systems are provided for reproducing CDs respectively. Each port is provided in each recording system for connecting the reproducing systems by an external cord. A switch circuit is provided in the port and arranged such that an output level is changed by connecting the external cord. A system controller is provided in each reproducing system and responsive to the change of the output level for designating one of the reproducing systems as a master system, and for designating the other reproducing system as a slave system.

11 Claims, 4 Drawing Sheets

| CONDITION | ORDINARY Use | MASTER | SLAVE | ERROR CONECTION |
|---|---|---|---|---|
| MASTER PORT | H | L | H | L |
| SLAVE PORT | H | H | L | L |

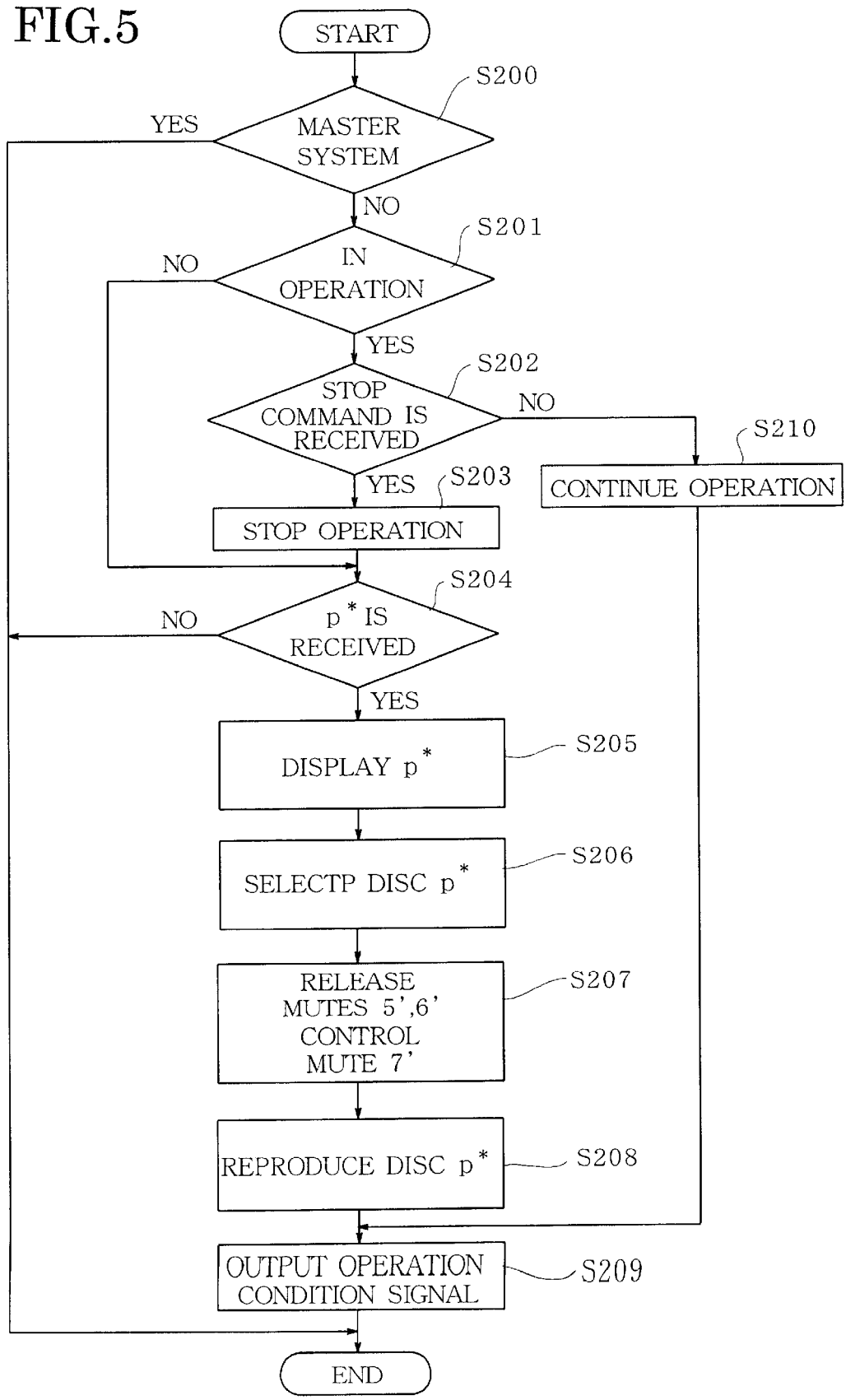

INFORMATION REPRODUCING SYSTEM INCLUDING A MASTER AND A SLAVE SYSTEM

BACKGROUND OF THE INVENTION

The present invention relates to an information reproducing system from optical discs.

There is known an information reproducing system in which a plurality of discs are stored and a desired disc can be reproduced.

In the case that the amount of information to be stored on discs exceeds the disc storing capacity of the reproducing system, it is necessary to increase the number of the systems. In such a case, the systems must be independently manually operated by the user.

In order to avoid troublesome operations, if a remote control device is used, plural systems may be operated at the same time. As a result, it is difficult to reproduce desired information.

Furthermore, since the systems are independently connected by wiring, the number of wires increases and the wiring becomes complicated.

SUMMARY OF THE INVENTION

An object of the present invention is to provide an information recording and reproducing system which comprises a plurality of systems in which only a desired disc is selected, and is simplified in wiring.

According to the present invention, there is provided a system for reproducing information recorded on a recording medium comprising, at least two reproducing systems, each of the reproducing systems having an automatic changer comprises a storage storing a plurality of recording mediums and a pickup, port means provided in each of the reproducing systems for connecting the reproducing systems by an external cord, switch means provided in the port means, the switch means being arranged such that an output level is changed by connecting the external cord, control means provided in each reproducing system and responsive to the change of the output level for designating one of the reproducing systems as a master system, and for designating the other reproducing system as a slave system.

The master system has an input port for receiving an information signal read at the slave system.

The control means is provided for commanding the slave system to reproduce a desired recording medium when the desired recording medium is stored in the slave system.

A speaker is connected to only the master system.

These and other objects and features of the present invention will become more apparent from the following detailed description with reference to the accompanying drawings.

BRIEF DESCRIPTION OF DRAWINGS

FIGS. 4 and 5 are flowchart showing operation of the system.

DETAILED DESCRIPTION OF THE PREFERRED EMBODIMENT

Figure 1:
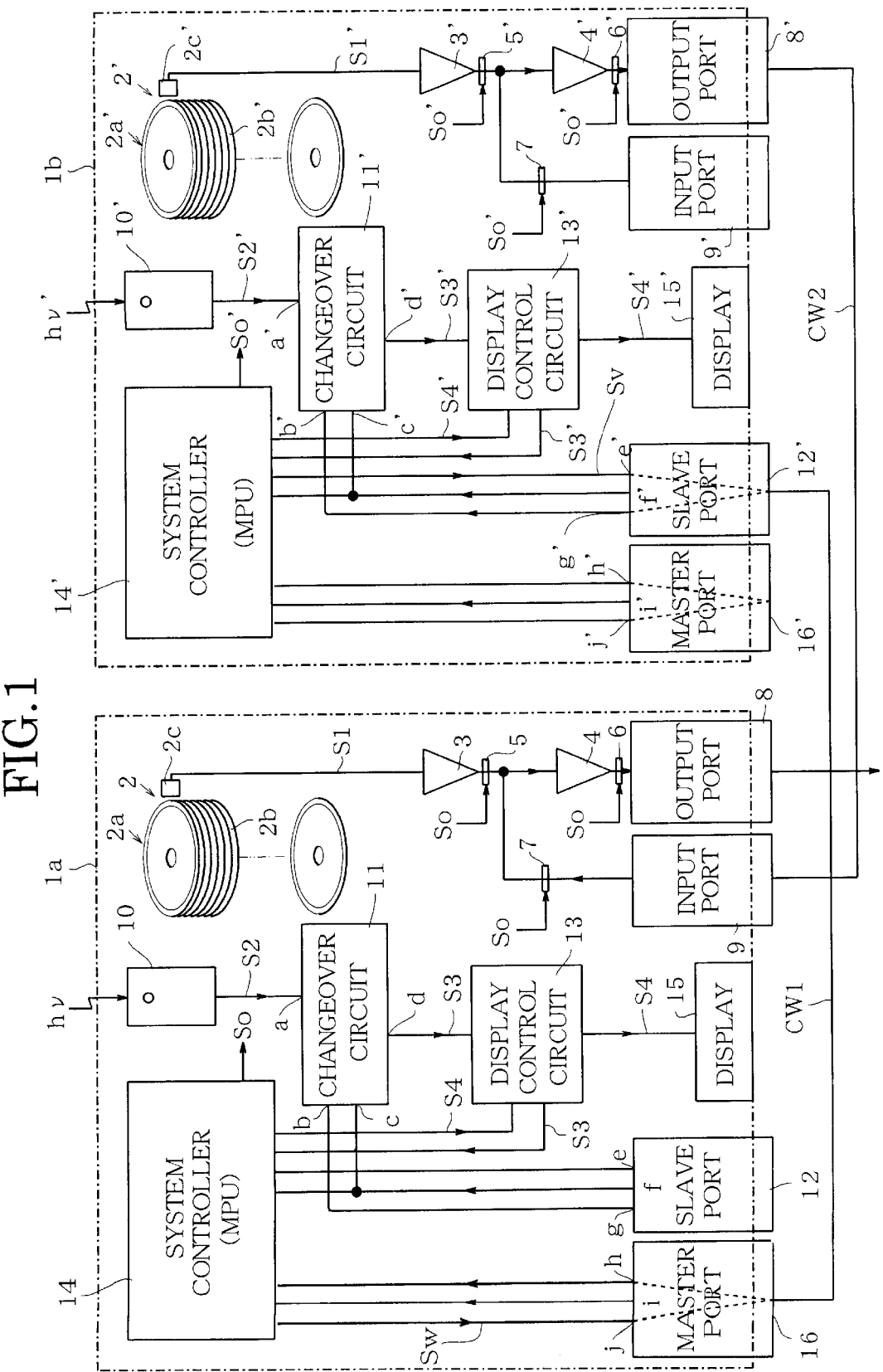
FIG. 1 is a block diagram showing a system according to the present invention.

Referring to FIG. 1 showing the system of the present invention, the system comprises a first reproducing system 1a and a second reproducing system 1b. Both reproducing systems 1a and 1b are equal in construction, and each of the systems has an auto changer having a maximum storing number N of CDs. In the first reproducing system 1a, an automatic disc changer 2, comprising a storage 2a storing a plurality of CDs 2b, and a pickup 2c is provided for reproducing a selected desired disc.

There is provided in the reproducing system 1a, first and second amplifiers 3 and 4 for amplifying an audio signal S1, first, second and third muting circuits 5, 6 and 7 operated by a muting signal S0 from a system controller 14.

An output terminal of the second muting circuit 6 is connected to a reproduction signal output port 8, and an input terminal of the third muting circuit 7 is connected to an outer signal input port 9. A remote control signal receiver is provided for receiving a remote control light hv from a remote controller and for producing a remote control signal S2, and a changeover circuit 11 for receiving the remote control signal S2.

The changeover circuit 11 has an input terminal a for receiving the remote control signal S2, input terminals b and c connected to output terminals e and g of a slave port 12 and an output terminal d connected to a display control circuit 13.

The terminal a of the changeover circuit 11 is connected to the terminal d when a high logical level H is applied to the input terminal c, and the terminal c is connected to the terminal d when a low logical level L is applied to the terminal c.

The display control circuit 13 applies a signal S3 from the changeover circuit 11 to the system controller 14. The system controller 14 applies a display signal S4 to a display 15 through the display control circuit 13 in accordance with the signal S3. The display 15 displays the content of the display signal S4.

The system controller 14 controls the operation of the first reproducing system 1a, and connected to the mute circuits 5, 6, 7 and to the slave port 12 and a master port 16.

Each of the output port 8 and input port 9 has terminals for connecting external cords. The slave port 12 has terminals e, f, g. The terminal f has a switch circuit shown in FIG. 2.

The switch circuit comprises a resistor R1, a fixed contact X1 connected to a source Vcc through the resistor R1, a resistor R2, a movable contact X2 connected to a ground through the resistor R2.

When an external cord is inserted into an opening X3, the movable contact X2 is removed from the fixed contact X1, so that the potential at the movable contact X2 becomes the ground potential of a low logical level L. When the external cord is removed from the opening X3, the movable contact X2 contacts with the fixed contact X1. Thus, the potential of the movable contact X1 becomes a high logical level H of a voltage divided by the resistors R1 and R2.

The movable contact X2 is connected to the terminal c of the changeover circuit 11 and to the system controller 14. The terminal g of the slave port 12 is connected to the terminal b of the changeover circuit 11.

The master port 16 has terminals j, i, h. The terminal i has the same construction as the terminal f.

The second reproducing system 1b has the same construction as the first reproducing system 1a, and corresponding sections are designated by the same references as the master system each of which is attached with a prime.

The operations of the first reproducing system 1a and the second reproducing system where both systems are separately operated will be described hereinafter.

The output port 8 of the first reproducing system 1a is connected to an information emitting device such as a speaker and a display. On the other hand, the input port 9, the slave port 12 and the master port 16 are not connected to the second reproducing system 1b. Consequently, the terminals f and j are at high logical levels H because the movable contact X2 contacts with the fixed contact X1. The case that both ports are at high logical levels H is an ordinary mode where both systems are independently operated as shown in the operation mode table of FIG. 3.

The system controller 14 controls the first reproducing system 1a in the ordinary mode in accordance with the operation mode.

In accordance with the high logical level H at the terminal f, the changeover circuit 11 connects the terminal a with the terminal d. Consequently, the remote control signal S2 from the receiver 10 is changed to the signal S3 which is fed to the display control circuit 13 and to the system controller 14. Thus, the master system is operated by the remote controller.

The system controller 14 produces the mute control signal S0 to open the mute circuits 5 and 6, and hence the audio signal S1 from the pickup 2c is amplified by the amplifiers 3 and 4 and outputted from the output port 8.

The operation of system where the first reproducing system 1a and the second reproducing system 1b are connected with each other will be explained hereinafter.

The user selects a master system and a slave system from the systems 1a and 1b. In the present embodiment, the first reproducing system 1a is designated as the master system. The system 1a is hereinafter called master system and the system 1b is called slave system. If there are three systems, one of the two slave systems is designated as the master system for the other slave system.

In the present embodiment, the master port 16 is connected to the slave port 12' of the second reproducing system 1b by an external cord CW1, and the input port 9 of the first reproducing system 1a is connected to the output port 8' by an external cord CW2. The output port 8 is connected to the speaker.

Since the external cord CW1 is connected to the terminals i and f', the terminals i and f' become low logical level L.

Furthermore, since the movable contact X2 contacts with the fixed contact X1 of each of the terminals f and i', the terminals f and i' become high logical level H.

In accordance with the logical levels L and H, the system controller 14 of the first reproducing system 1a controls the system 1a as the master (FIG. 3), and the master system can be operated by the remote controller because of the high logical level H at the terminal f.

Figures 2, 3:
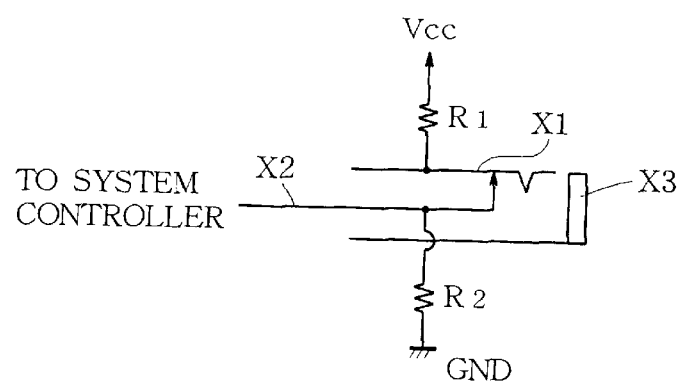
FIG. 2 shows a switch circuit provided in a port.
FIG. 3 is a table showing operation modes.

On the other hand, the second reproducing system 1b is operated as the slave in accordance with the high logical level H at the master port 16' and the low logical level L at the slave port 12' (FIG. 3). Since the terminal f' is at the low logical level L, the terminal b' of the changeover circuit 11' is connected to the terminal d'. Consequently, the remote control signal becomes ineffective.

Figure 4:
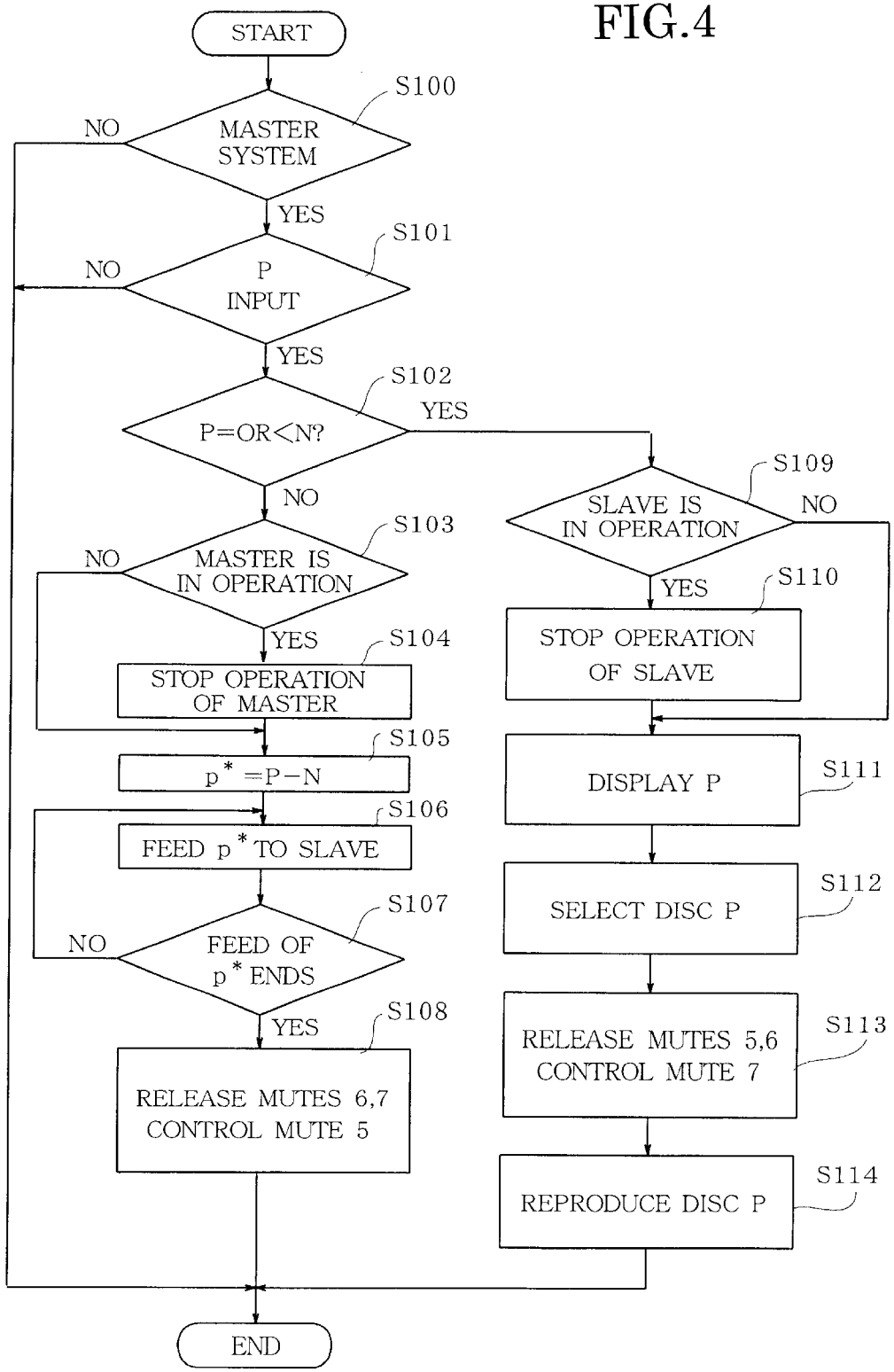

The operations of the first reproducing system 1a and second reproducing system 1b will be described with reference to FIGS. 4 and 5. FIG. 4 is a flowchart showing the operation of the master system, and FIG. 5 is a flowchart showing the operation of the slave system.

Referring to FIG. 4, at a step S100, it is determined whether the master system is designated as the master. If the master system is not designated, the first reproducing system 1a and the second reproducing system 1b are independently operated as described above.

If the master system is designated as the master, it is determined whether the remote control signal indicates a CD ordinal number P at a step S101. If it is the case, the number P is compared with a maximum ordinal number N stored in the automatic disc changer 2 at a step 102. When the number P is equal to or smaller than the number N, it is determined whether the second reproducing system 1b is in reproducing operation by detecting a slave operation signal SV at a step 109. When the slave system is in operation, an operation stop command is supplied to the slave system from the first reproducing system 1a (step S110).

At a step S111, the number P of the desired CD is displayed on the display 15, and the desired CD is taken out from a magazine (not shown) (step S112). At a step S113, the muting circuits 5 and 6 are released to pass the signal S1 and the muting circuit 7 is controlled. At a step S114, the CD of number P is reproduced at the first reproducing system 1a.

If the ordinal number P is larger than the ordinal number N at the step S102, the program proceeds to a step S103. It is determined the master system is in reproducing operation at the step S103. If it is the case, the reproducing operation is stopped at a step S104.

At a step S105, the difference number p* between the numbers P and N is obtained. The difference number p* is fed to the system controller 14' of the second reproducing system 1b by the signal SW.

The system controller 14' receives the difference number p* at a step S204 of FIG. 5. At a step S209, the second reproducing system 1b feeds the receive confirmation signal to the master system by the signal SV.

The system controller 14 of the first reproducing system 1a receives the confirmation signal at a step S107. At a step S108, the mute circuits 6, 7 are released, and the mute circuit 5 is operated.

In the flowchart of FIG. 5, the automatic disc changer 2' reproduces the CD of the number p* at steps 206–208. The audio signal S1' reproduced in the second reproducing system 1b is fed from the output port 8' to the input port 9 of the first reproducing system 1a.

The audio signal S1' is outputted from the output port 8 passing through the mute circuits 6, 7 and supplied to the speaker. Thus, the CD of the number p* which exceeds the storing number N of the first reproducing system 1a is reproduced by the second reproducing system 1b and the first reproducing system 1a.

The operation of the second reproducing system 1b is described with reference to FIG. 5.

At a step S200, it is determined whether the slave system is designated as the master. When the slave system is designated as the master, the slave system is independently operated in the ordinary mode. If the slave system is not designated as the master, and the slave system is in reproducing operation at a step S201, it is determined whether a stop signal is received at a step S202. If the stop signal is received, the reproducing operation is stopped at a step S203, and if not, reproducing operation is continued at a step S210.

At a step S204, it is determined whether the difference number p* is received. When the number p* is received, the number p* is displayed on the display 15' (step S205), and a CD of the number p* is taken out from a magazine (step S206). At a step S207, the mute circuits 5' and 6' are released, and the mute circuit 7 is controlled, and the CD of the number p* is reproduced by the second reproducing system 1b (step S208). At a step S209, the slave operation condition signal SV is fed to the first reproducing system 1a. Thus, the speaker connected to the master system produces the sounds dependent on the audio signal S1'.

Here, it is assumed that the slave is designated as M, and there is provided n sets of slave M (M1 - - - Mn). In the slave M1, there is CD storing positions N+1~2N, and in the slave M2, there is CD storing positions 2N+1~3N. Therefore, in the slave Mn, the CD storing position is N×n+1~N×(n+1).

In accordance with the present invention, since only the master system responds to the remote control signal, complicated operations of a plurality of systems are avoided. Since an external device such as the speaker is connected only to the master system, the number of wirings is reduced.

While the invention has been described in conjunction with preferred specific embodiment thereof, it will be understood that this description is intended to illustrate and not limit the scope of the invention, which is defined by the following claims.

What is claimed is:

1. A system for reproducing information recorded on a recording medium comprising:
   at least two reproducing systems, each of the reproducing systems having an automatic changer which comprises a storage configured to store a plurality of recording mediums and a pickup;
   port means provided in each of the reproducing systems for connecting the reproducing systems by an external cord;
   switch means provided in the port means, the switch means being arranged such that an output level is changed by connecting the external cord; and
   control means provided in each reproducing system and responsive to the change of the output level for designating one of the reproducing systems as a master system, and for designating the other reproducing system as a slave system.

2. The system according to claim 1 wherein the master system has an input port for receiving an information signal read at the slave system.

3. The system according to claim 1 wherein each of the master system and the slave system has a maximum storing number N, and n slaves (M1 - - - Mn) are provided, a storing position in the slave Mn is expressed as N×n+1~N×(n+1).

4. The system according to claim 1 wherein the control means is provided for commanding the slave system to reproduce a desired recording medium when the desired recording medium is stored in the slave system.

5. The system according to claim 2 wherein only the master system is connected an information emitting device, whereby the information signal is reproduced from the information emitting device.

6. A system for reproducing information recorded on a recording medium comprising:
   at least two reproducing systems, each of the reproducing systems having an automatic changer which comprises a storage configured to store a plurality of recording mediums and a pickup;
   ports provided in each of the reproducing systems for connecting the reproducing systems by an external cord;
   switch circuits provided in the ports, the switch circuits being arranged such that an output level is changed by connecting the external cord; and
   a system controller, provided in each reproducing system and responsive to the change of the output level for designating one of the reproducing systems as a master system, and for designating the other reproducing system as a slave system.

7. The system according to claim 6, wherein the master system has an input port for receiving an information signal read at the slave system.

8. The system according to claim 6, wherein each of the master system and the slave system has a maximum storing number N, and n slaves (M1 - - - Mn) are provided, a storing position in the slave Mn is expressed as N×n+1~N×(n+1).

9. The system according to claim 6, wherein the system controller is provided for commanding the slave system to reproduce a desired recording medium when the desired recording medium is stored in the slave medium.

10. The system according to claim 7, wherein only the master system is connected with an information emitting device, whereby the information signal is reproduced from the information emitting device.

11. A system for reproducing information recorded on a recording medium comprising:
    at least two reproducing systems, at least one of which has a storage storing a recording medium and a pickup;
    ports provided in each of the reproducing systems for connecting the reproducing systems by an external cord;
    switch circuits provided in the ports, the switch circuits being arranged such that an output level is changed by connecting the external cord;
    a system controller provided in each reproducing system and responsive to the change of the output level for designating one of the reproducing systems as a master, and for designating the other reproducing system as a slave system.

* * * * *